L. W. THOMPSON.
REGULATING SYSTEM FOR DYNAMO ELECTRIC MACHINES.
APPLICATION FILED JULY 10, 1918.

1,390,843.    Patented Sept. 13, 1921.

Inventor:
Louis W. Thompson,
by Albert G. Davis
His Attorney.

UNITED STATES PATENT OFFICE.

LOUIS W. THOMPSON, OF SCHENECTADY, NEW YORK, ASSIGNOR TO GENERAL ELECTRIC COMPANY, A CORPORATION OF NEW YORK.

REGULATING SYSTEM FOR DYNAMO-ELECTRIC MACHINES.

1,390,843.　　　　　　　Specification of Letters Patent.　Patented Sept. 13, 1921.

Application filed July 10, 1918. Serial No. 244,169.

*To all whom it may concern:*

Be it known that I, LOUIS W. THOMPSON, a citizen of the United States, residing at Schenectady, county of Schenectady, State of New York, have invented certain new and useful Improvements in Regulating Systems for Dynamo-Electric Machines, of which the following is a specification.

My invention relates to regulating systems for dynamo-electric machines and particularly to regulating systems for alternating current dynamo-electric machines.

The object of my invention is to provide a new and improved regulating system for varying the excitation of an alternating current dynamo-electric machine as the load current therein varies.

I provide in combination with an alternating current generator a rotary converter having its direct current side connected so as to control the current in the field circuit of the alternating current generator and its alternating current side connected so that the voltage impressed thereon varies with an electrical condition of the generator. In order to prevent the voltage of the generator overshooting, I provide anti-hunting means responsive to variations in the exciting current of the generator for retarding the variations in the direct current voltage of the converter upon variations in the electrical condition of the generator which controls the voltage impressed upon the alternating current side of the converter. With this arrangement the voltage of the generator does not fully respond to short variations in the electrical condition of the generator controlling the voltage impressed upon the alternating current side of the converter whereas if the variations are of longer duration the voltage of the generator does fully respond.

Figure 1:
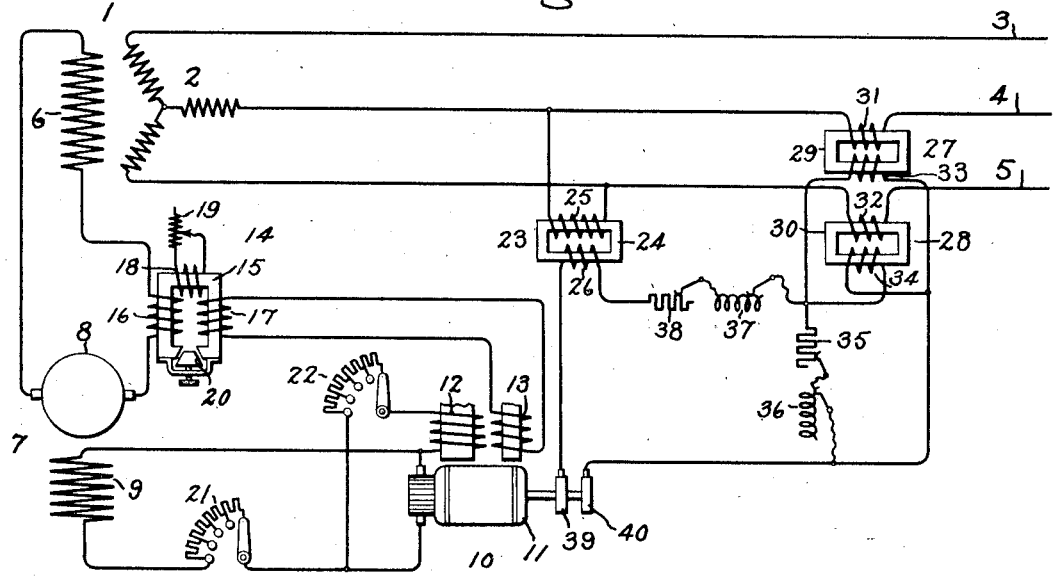
Figure 2:
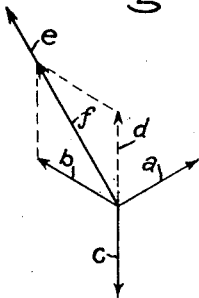

My invention may best be understood by referring to the accompanying drawings in Figure 1 of which is diagrammatically shown my invention embodied in a regulating system for a three-phase alternating-current generator, and in Fig. 2 of which is shown an explanatory diagram.

Referring to Fig. 1, 1 denotes a three-phase alternating-current generator having an armature winding 2, connected to the mains 3, 4 and 5, and a field winding 6. 7 denotes an exciter having an armature 8 and an exciting winding 9, 10 denotes a split pole rotary converter having an armature 11, a main exciting winding 12, and an auxiliary exciting winding 13. 14 denotes transforming means having a magnetic core 15, an inducing winding 16, an induced winding 17, and a regulating winding 18 short circuited upon itself through an adjustable impedance 19. The core 15 is also provided with an air gap and adjustable means 20 for varying the air gap. The field winding 6 of the alternator 1 is connected in series with the inducing winding 16 of the transformer 14 to the armature 8 of the exciter 7. The exciting winding 9 of the exciter 7 is connected, in series with an adjustable rheostat 21, to the direct current side of the armature 11 of the converter 10, while the exciting winding 12 of the converter 10 is connected, in series with the adjustable rheostat 22, to the direct current side of the armature 11. The auxiliary exciting winding 13 of the converter 10 is connected in series with the induced winding 17 of the transformer 14. 23 denotes a potential transformer having a core 24, an inducing winding 25, connected between the mains 4 and 5, and an induced winding 26. 27 and 28 denote current transformers having cores 29 and 30, inducing windings 31 and 32, connected respectively in series with the mains 4 and 5, and induced windings 33 and 34. 35 denotes an adjustable resistance and 36 an adjustable reactance. The induced windings 33 and 34 of the transformer 27 and 28 are each connected across a circuit portion including the adjustable resistance 35 and the adjustable reactance 36, the connections of the winding 34 being reversed as shown for a purpose hereinafter described. One terminal of the induced winding 33, one terminal of the induced winding 34, and one terminal of the adjustable resistance 35 are electrically connected, preferably by means of an adjustable reactance 37 and an adjustable resistance 38, in series with the induced winding 26 of the potential transformer 23 to a collector ring 39 on the armature 11, while the opposite terminals of the induced windings 33 and 34 and the terminal of the adjustable reactance 36 are connected to a collector ring 40 on the armature 11. The auxiliary exciting winding 13 of the converter 10 is preferably arranged to develop in the winding of the armature 11 a voltage which is added to or subtracted from the alternating current voltage applied to the collector rings 39—40, depending upon the direction of current flow in the auxiliary winding. Hence variations in the amount or direction of the current in the winding 13 serves to vary the direct current voltage available at the direct current side of the converter. By varying the impedance 19 and the air gap in the core 15, the relation between the currents in the winding 16 and in the winding 17 may be adjusted in a suitable manner.

The operation of my invention, as at present understood, is as follows:

Assume the alternating-current generator 1, the exciter 7 and the rotary converter 10 to be in operation and that no load current is being drawn from the mains 3, 4 and 5. The potential transformer 23 will then cause a voltage to be applied to the collector rings 39—40 and the exciting winding 9 of the exciter 7 will be supplied with current at a voltage bearing a certain relation to the voltage impressed upon the collector rings 39—40. The system will have been so adjusted that when no load current is being drawn from the mains 3, 4 and 5, the exciting current, which is caused to flow in the exciting winding 9 of the exciter 7 when a desired predetermined voltage obtains across the mains 4 and 5, will have the correct value to excite the field winding 6 of the alternating-current generator 1 to such a degree as to maintain the desired predetermined voltage across the mains 4 and 5. In order to accomplish the desired adjustment of the system, the rheostat 21, in series with the exciting winding 9, the adjustable reactance 37, and the adjustable resistance 38 may be suitably varied. The current supplied to the collector rings 39—40 for the most part traverses the adjustable resistance 35 and the adjustable reactance 36, rather than the induced windings 33 and 34, by reason of the high reactance of the windings 33 and 34 when the current in the mains 4 and 5 is low or substantially zero. Now assuming that load current is being drawn from the mains 3, 4 and 5, the induced windings 33 and 34 will cause current to flow through the circuit portion including the adjustable resistance 35 and the adjustable reactance 36, and the voltage developed in the induced winding 26 of the potential transformer 23 will be augmented by the voltage existing across the circuit portion including the resistance 35 and reactance 36, which latter voltage varies in proportion to the current in the mains 4 and 5 and is substantially in phase with the voltage in the induced winding 26, as will be clear upon considering the vector diagram of Fig. 2 in which is shown the phase relations of voltage and currents for unity power factor load. Assume the vectors $a$, $b$, and $c$ in Fig. 2 to represent the phase positions of the currents in mains 3, 4 and 5, respectively. $b$ and $c$ will, therefore, represent the phase positions of the currents in induced windings 33 and 34 of the transformers 27 and 28. By reference to Fig. 1, it will be seen that the connections of the winding 34 are reversed. Therefore, to represent the vector relation of the currents in the windings 33 and 34, the vector $c$ should be reversed, as indicated by dotted line $d$. The voltage induced in winding 26 will have the phase position indicated by the line $e$. Adding the currents represented by the lines $b$ and $d$ vectorially, it will be found that the resultant current, which is represented by the line $f$, is in phase with the voltage represented by the line $e$. The resultant current $f$ will also vary in proportion to the variations in the current in the mains 4 and 5, so that the voltage across the circuit portion comprising the adjustable resistance 35 and reactance 36 will vary with the current in mains 4 and 5 and the voltage applied to the slip rings 39 and 40 will equal the voltage induced in the secondary winding 26 of the potential transformer 23 plus a voltage which is proportional to the load current. The adjustable resistance 35 and adjustable reactance 36 permit of the adjustment of the phase relation between the currents in the mains 4 and 5 and the voltage across the circuit portion including the resistance 35 and reactance 36 so that for a load circuit of any predetermined power factor, the voltage across said circuit portion may be brought into phase with the voltage in winding 26. Since the voltage impressed upon the collector rings 39 and 40 varies with the load in the mains 3, 4 and 5, the current in the exciting winding 9 of the exciter, and hence the current in the field winding 6 of the alternating-current generator 1, will vary in accordance with the load, thereby effecting the desired compounding of the generator 1.

The auxiliary field winding 13 of the converter 10 and the transforming means 14 function to prevent overshooting of the voltage on the mains 3, 4 and 5, since changes in the current in the circuit of the field winding 6 modify the voltage available on the direct current side of the converter 10 so as to delay the variations in the current in the winding 6 upon a variation in the current in the mains 3, 4 and 5. In other words, if the current in the mains 3, 4 and 5 is varied the effect of the variation upon the excitation of the generator 1 is retarded through the action of the transforming means 14 and auxiliary field winding 13 so that if the variation is of short duration the voltage of the generator will not fully respond to the variation in the generator current, whereas if the variation is of longer duration the voltage of the generator will fully respond to the variation in the generator current. As previously indicated, by varying the adjustable impedance 19, the relation between the currents in the windings 16 and 17 may be suitably varied. Although my invention is illustrated and described in connection with a three-phase alternating current generator, it will be obvious to those skilled in the art how it may be applied to other alternating current dynamo-electric machines of the same or a different number of phases.

While I have herein shown and described one modification of my invention, I do not desire to be limited to the exact arrangement shown and described, but seek to cover in the appended claims all those modifications which come within the true spirt and scope of my invention.

What I claim as new and desire to secure by Letters Patent of the United States, is,—

1. The combination with an alternating current generator having an armature winding and an exciting winding, of a rotary converter having its direct current side connected so as to control the current in said exciting winding and its alternating current side connected so that the voltage impressed thereon varies with an electrical condition of said armature winding, and means responsive to variations in the current in said exciting winding for retarding the variations in the direct current voltage of said converter upon variations in said electrical condition of said armature winding.

2. The combination with an alternating-current generator having an armature winding and an exciting winding, of a rotary converter having its direct current side connected so as to control the current in said exciting winding, and its alternating current side connected so that the voltage impressed thereon varies with an electrical condition of said armature winding, and means responsive to variations in the current in said exciting winding for modifying the ratio of voltage transformation of said converter.

3. The combination with an alternating-current generator having an armature winding and an exciting winding, of a rotary converter having a main field winding and an auxiliary field winding, said auxiliary field winding being arranged to modify the relation between the voltage on the alternating current side of the converter and the voltage on the direct current side of the converter, means for impressing a voltage varying with an electrical condition of said armature winding upon the alternating current side of the converter, means for connecting the direct current side of the converter to control the current in said exciting winding, and means responsive to the variations in the current in said exciting winding for varying the current in said auxiliary field winding.

4. The combination with an alternating-current dynamo-electric machine having an armature winding and an exciting winding, of a rotary converter having a main field winding and an auxiliary field winding, said auxiliary field winding being arranged to modify the relation between the voltage on the alternating current side of the converter and the voltage on the direct current side of the converter, means responsive to the current in said armature circuit for impressing a voltage varying with the current in said armature winding upon the alternating current side of the converter, means for connecting the direct current side of the converter to control the current of said exciting winding, and means responsive to the variations in the current in said exciting winding to vary the current in said auxiliary field winding.

5. The combination with an alternating-current dynamo-electric machine having an armature winding and an exciting winding of a rotary converter, static transformer means interposed between said armature winding and the alternating current side of said converter for impressing upon said converter an alternating current voltage varying with the current in said armature winding, means for connecting the direct current side of said converter to control the current in said exciting winding, and transforming means responsive to variations in the current in said exciting winding for varying the voltage delivered at the direct current side of said converter.

6. The combination with an alternating-current generator having an armature winding and an exciting winding, of an exciter having an armature connected to said exciting winding, and a field winding, a rotary converter having a direct current side connected to excite said field winding, and an alternating current side, means comprising a current transformer for connecting said armature winding to the alternating current side of said converter and impressing thereon an alternating current voltage varying with the current in said armature winding, and transforming means responsive to variations in the current in said exciting winding for varying the voltage delivered at the direct current side of said converter.

7. The combination with a three-phase alternating-current generator having an armature winding and an exciting winding of rotary transforming means having an alternating current side and a direct current side, a potential transformer having an inducing winding connected across two phases of said armature winding and an induced winding, a circuit portion comprising an adjustable reactance and an adjustable resistance, a current transformer for each of said two phases having an inducing winding connected in series therewith and an induced winding, the induced winding of each of said series transformers being connected across said circuit portion with the connections of one of them reversed, means for connecting the induced winding of said potential transformer and the induced windings of said series transformers and said circuit portion in circuit to the alternating current side of the rotary transforming means, and means for connecting the direct current side of said rotary transforming means to control the current in said exciting winding.

In witness whereof, I have hereunto set my hand this 8th day of July, 1918.

LOUIS W. THOMPSON.